Figure 1:
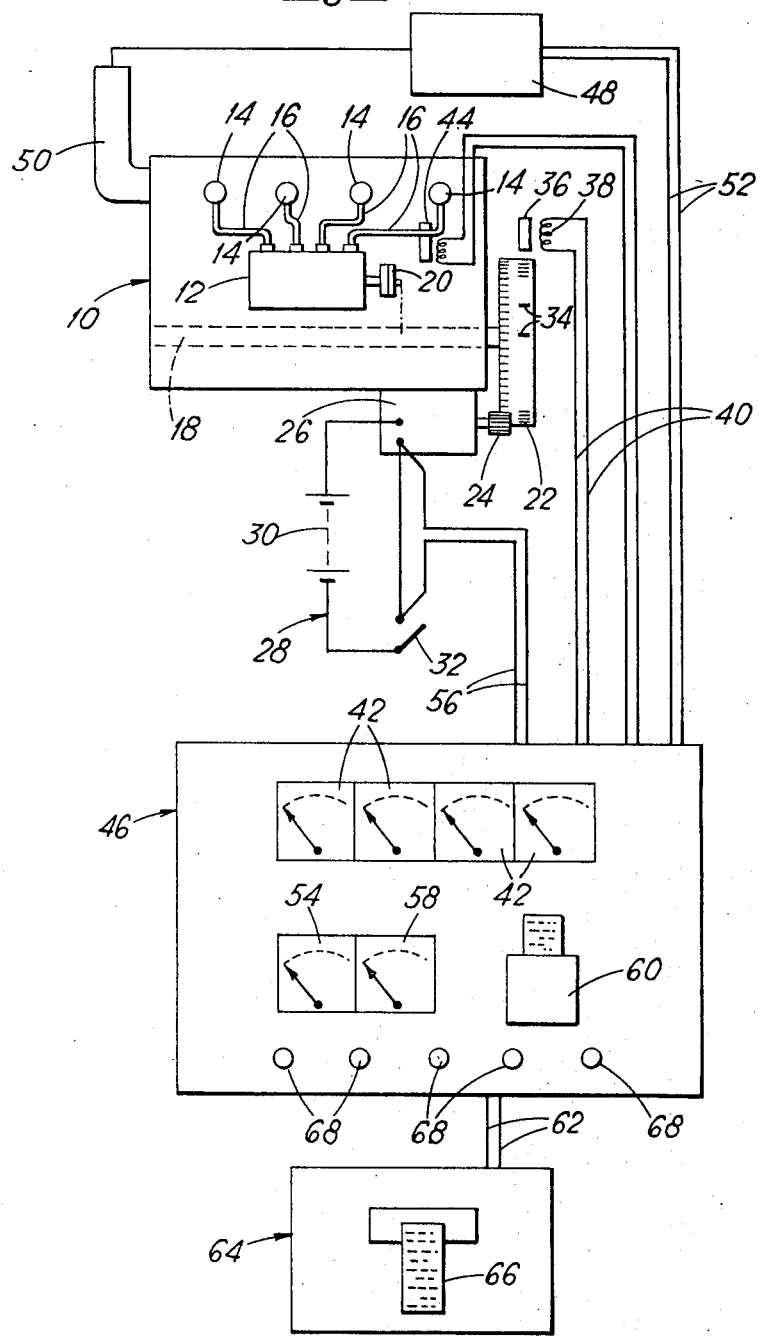

United States Patent [19]
Emerson

[11] 3,815,411
[45] June 11, 1974

[54] ENGINE TEST EQUIPMENT
[75] Inventor: Reginald Stanley Emerson, Buckinghamshire, England
[73] Assignee: Leslie Hartridge Limited, Buckingham, England
[22] Filed: Sept. 12, 1972
[21] Appl. No.: 288,442

[30] Foreign Application Priority Data
Sept. 15, 1971  Great Britain .................... 43050/71

[52] U.S. Cl. ............................................. 73/117.3
[51] Int. Cl. ........................................ G01m 15/00
[58] Field of Search............... 73/116, 119 A, 117.3

[56] References Cited
UNITED STATES PATENTS

| | | | |
|---|---|---|---|
| 2,192,863 | 3/1940 | Hetzel et al. ............... | 73/119 A UX |
| 2,344,037 | 3/1944 | Fuller ....................... | 73/119 A UX |
| 2,666,325 | 1/1954 | Withers et al. ............. | 73/119 A UX |
| 3,350,928 | 11/1967 | Fedde .................................. | 73/116 |
| 3,421,367 | 1/1969 | Mears et al. .......................... | 73/116 |
| 3,474,667 | 10/1969 | Fuchs.................................. | 73/116 |
| 3,517,170 | 6/1970 | Banham, Jr. .................... | 73/116 UX |
| 3,630,076 | 12/1971 | Staudt................................ | 73/117.3 |
| 3,657,922 | 4/1972 | Sibeud .............................. | 73/117.3 |

*Primary Examiner*—Jerry W. Myracle
*Attorney, Agent, or Firm*—Berman, Bishoff & Platt

[57] ABSTRACT

Engine test equipment comprising a transducer which can be positioned, or is positioned, adjacent a rotatable engine part which, in operation of the engine, rotates at a rate corresponding to or dependent on the rate of rotation of the engine crankshaft, the rotatable engine part being provided with at least one mark (as defined herein) the passage of which past the transducer is detected by the latter.

19 Claims, 3 Drawing Figures

ENGINE TEST EQUIPMENT

This invention relates to engine test equipment for use in or with internal combustion engines, particularly (but not exclusively) diesel engines.

When testing an engine mounted on a test bed, it is possible to attach sensing devices to the engine to provide indications of the working conditions of various parts of the engine. In addition, it is possible to operate the engine at different speeds and also, at the same time, to adjust the load on the engine. From the results of the tests it is possible to obtain information about the performance of the engine under all conditions of speed and load and it is also possible to carry out various adjustments to the fuel supply system to ascertain what effect these have on the performance of the engine.

Once, however, an engine has been installed in a vehicle which is in general use, it is inconvenient to fit the abovementioned devices to the engine and, in addition, it is not always practical to apply a load to the engine. Hence, in order to check that an engine is in good operating condition or to diagnose faults which may occur during the every-day life of the engine, some form of engine test equipment is required which requires the minimum amount of apparatus to be connected to the engine and yet which can provide an indication of where a fault or faults, if such exist, lie. Moreover, the equipment must be able to cope with engines having different numbers of cylinders.

When an engine is running at a constant speed with the gearbox in neutral, the only load on the engine is that due to the frictional resistance of the engine itself and its ancillary equipment together with any power which may be taken from the engine — for instance by the generator or alternator. When the engine is accelerated, however, the rate of acceleration is determined largely by the moment of inertia of the engine and, providing the moment of inertia is known, the torque developed by the engine can then be calculated. Further, if the time taken for the engine to accelerate from a low speed to a high speed is measured, then the mean torque over that speed range can be calculated. Also, by measuring the speed of rotation of the engine before and after each firing stroke, the work done during that firing stroke can be estimated. Once this test has been carried out, it is possible to tell whether the engine is functioning properly as far as torque development is concerned.

If more or less mean torque is produced, attention can first be directed to the fuel system which may be supplying more or less fuel than it should. Alternatively, there may be an engine condition which results in an abnormally high frictional torque which can be assessed by measuring the deceleration rate over a specified speed range. If the "work per firing stroke" measurement shows unbalance between the cylinders, then attention can be directed either to the fuel system for the appropriate cylinder or cylinders or to the physical condition of that cylinder or cylinders. The latter condition may be diagnosed, for example, by cranking the engine using the engine starter motor.

It will thus be apparent from the above remarks that the test equipment must be provided with apparatus for processing signals derived from the engine and which occur at a known position of the crank-shaft of the engine, i.e., at a known position relative to a firing stroke. In addition, it will be apparent that the engine must have a signal-producing device or devices incorporated in it or that the device or devices must be readily attachable to the engine when such testing is to be carried out.

With these considerations in mind, the present invention is directed to engine test equipment comprising a transducer which can be positioned, or is positioned, adjacent a rotatable engine part which, in operation of the engine, rotates at a rate corresponding to or dependent on the rate of rotation of the engine crankshaft, the rotatable engine part being provided with at least one mark (as defined herein) the passage of which past the transducer is detected by the latter.

For the purposes of this Specification, the term "mark" is used to include a visible spot, a hole, a notch, a projection or some discontinuity in the surface of the rotatable engine part so that the passage of the mark past the transducer can be detected by the transducer.

In one form of engine test equipment in accordance with the invention, the rotatable engine part is the flywheel of the engine and a single transducer is provided. In the case of a four-cylinder engine, two pairs of marks are formed on the engine flywheel with the marks of each pair circumferentially spaced apart by the same amount. Further, the two pairs of marks are substantially diametrically opposed to each other. With this arrangement, and assuming that the flywheel is driven at a constant speed, the transducer will produce four pulses per revolution of the flywheel, and the time interval between the pulses produced by one pair of marks will be equal to the time interval between the pulses produced by the other pair of marks. If the flywheel is accelerating at a constant rate, then the time interval between the pairs of pulses produced by one pair of marks will be slightly longer than the time interval between the pulses produced by the second pair of marks and so on. The reduction in time interval is of course due to the acceleration of the flywheel, and these decreasing time intervals can be used to calculate the torque developed by the engine providing the amount of inertia of the engine is known.

In practice, the flywheel will not accelerate at a constant rate due to slight unbalance of the power outputs of the cylinders even in what might be termed a good engine. In the case of an engine having a fault, it is possible that the power output of one of the cylinders will be considerably below the power output of the other cylinders so that the rate of acceleration falls considerably during the firing stroke of this particularly cylinder. In some cases no acceleration of the flywheel may be achieved, and in a particularly bad case the flywheel may in fact decelerate during this period. The signals obtained from the transducer can be processed to provide an indication of the mean effective torque developed by each cylinder during the firing portion of the cycle and it is for this purpose that, in the case of a four-cylinder engine operating on a four-stroke cycle, two pairs of marks are provided. In the case of a six-cylinder four-stroke engine, three pairs of marks would be provided on the flywheel, the pairs of marks being substantially equi-spaced in appropriate relationship with the firing strokes of the engine. Preferably the pairs of marks are so positioned on the flywheel that a pulse will be produced, as the marks pass the transducer, just before top dead centre and just after top dead centre of the particular cylinder.

It is essential with the above arrangement that the marks of each pair of marks should be spaced by a substantially equal amount and the necessary accuracy may, in some instances, involve manufacturing difficulties. Certain of these difficulties can be overcome by providing a pair of transducers which are spaced-apart circumferentially about the flywheel by a known distance and by providing two marks on the flywheel, the marks being substantially diametrically opposed in the case of a four-cylinder, four-stroke engine. For a six-cylinder engine, three marks would be provided on the flywheel.

The time intervals between the pulses produced by the transducer or the pair of transducers in the two arrangements described above can provide information relating to engine speed, the acceleration of the flywheel due mainly to an individual cylinder, information regarding the torque developed by the engine over a specific speed range and/or information concerning the torque developed over an engine cycle, this being two revolutions in the case of a four-stroke engine.

The engine test equipment of the present invention can include means for determining the timing of injection of fuel to the engine using a pulse derived from a further transducer which, for example, senses pressure in a connection between the fuel pumping element and the injector valve of the engine. Alternatively, such a signal may be obtained from a transducer which is responsive to the lift of one of the valve members in the fuel injection system. The signals produced by the transducer associated with the fuel system can be compared with the signals produced by the transducer or transducers associated with the flywheel to provide an indication of the dynamic timing of the injection of fuel, and also an indication can be obtained that the device which varies the timing of injection of fuel is operating correctly. This may be obtained by determining the timing of injection of fuel at a number of predetermined engine speeds.

Furthermore, it will be appreciated that a signal occurring in a specified relationship to the engine camshaft can be used to indicate which cylinder or its associated equipment is causing any unbalance detected in the above-mentioned test or tests, e.g. a cranking test. Conveniently this signal can be the pulse mentioned in relation to the timing in the preceding paragraph.

In an alternative application, the presence or absence of unbalance can be detected using similar techniques to that already described with the engine operating under conditions other than the acceleration test mentioned above. For example, the vehicle can be placed on a chassis dynamometer and the engine run under known conditions of speed and load. From this it is possible to determine whether a fault in the performance of the engine is due to a particular cylinder or its associated equipment or to something common to all the cylinders.

The engine test equipment will normally include an electronic processor whereby the time interval between the two electrical pulses produced in respect of each pair of marks by one transducer or by each mark and two transducers arranged close to the rotatable engine part gives rise to an electrical signal which permits a function related to the BMEP for each piston and cylinder, and for the engine as a whole, to be displayed or indicated on appropriate display or indicating means such as electrical meters and/or on a printer. The electronic processor can also include means whereby the electrical signals or pulses from the said transducer or transducers, as well as the pulse from the transducer associated with the fuel supply system, are used to display or indicate the angular time relationship between the top dead centre of each piston (or a point angularly related thereto) and the commencement of fuel injection.

Figure 2:
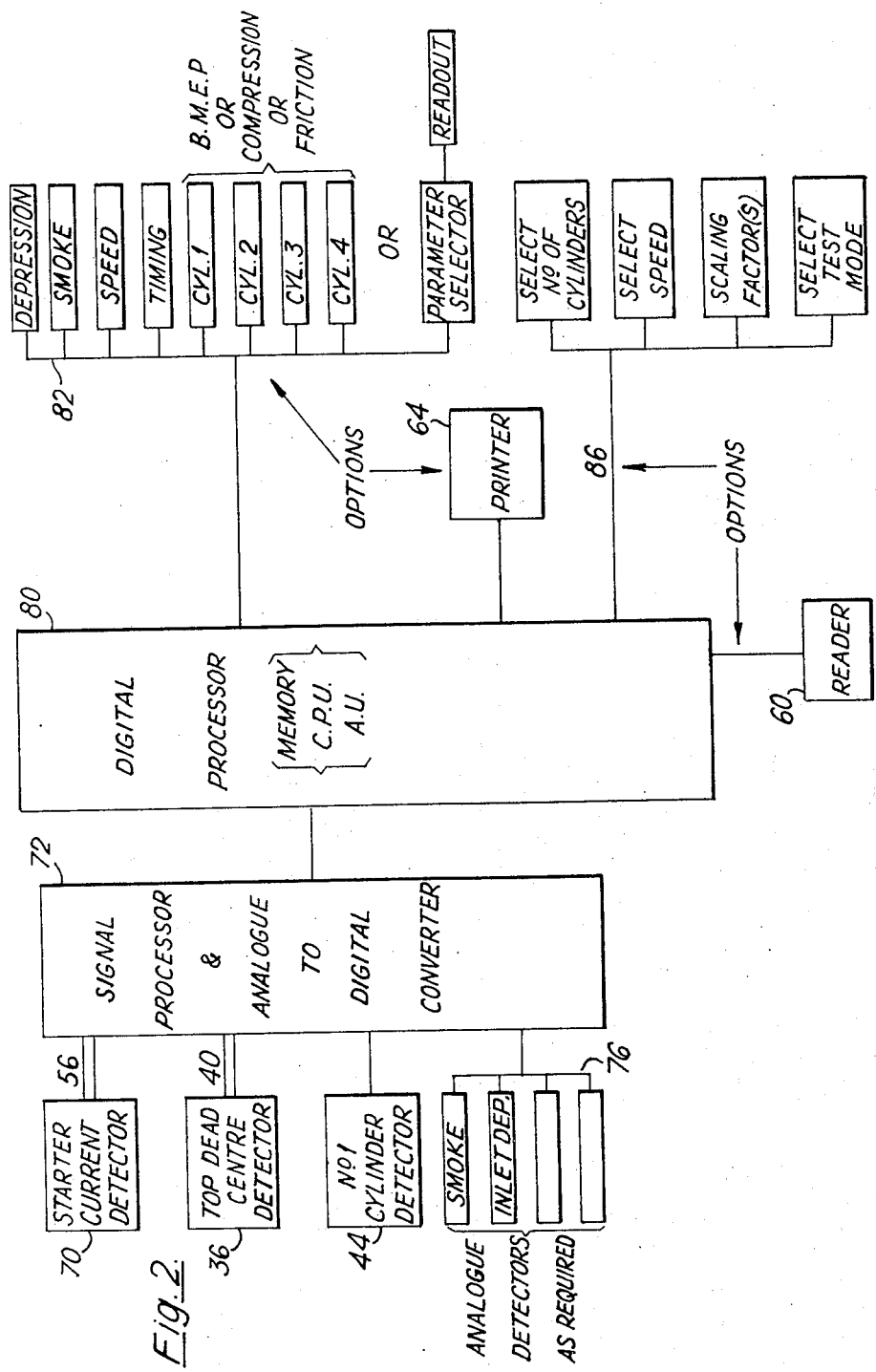
Figure 3:
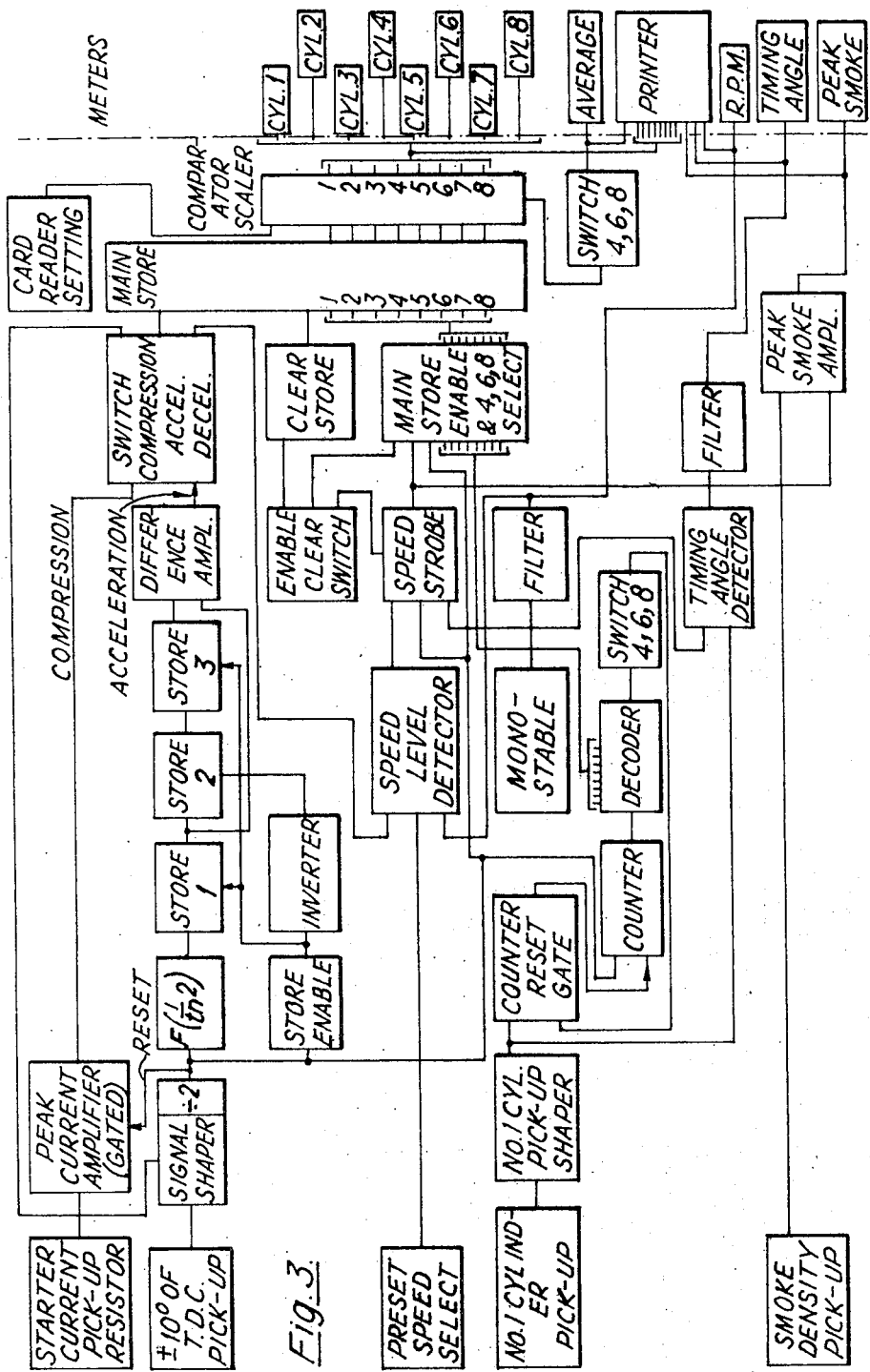

An example of testing apparatus in accordance with the invention is shown in the accompanying drawings, in which:

FIG. 1 is a diagrammatic view of a compression-ignition engine and the engine test equipment; and FIGS. 2 and 3 are block diagrams illustrating two alternative forms of electronic processors forming part of the equipment.

As indicated above, FIG. 1 shows a compression ignition engine 10 installed, for example, in a road vehicle such as a motor car or lorry. In this particular instance, the engine has four cylinders and pistons (not shown) and is provided with highpressure fuel injection equipment 12 comprising four fuel injectors 14 provided with fuel injection pipes 16 leading to the individual cylinders. The drive for the fuel injection equipment 12 is taken off the crankshaft 18 of the engine through driving gear 20.

Mounted on the shaft 18 of the engine is a conventional flywheel 22 having the usual drive connection 24 with a starter motor 26, the starter motor being included in an electrical starter circuit 28 which includes a battery 30 and a starter switch 32. In contrast to existing engines, however, the flywheel 22 is provided with two pairs of marks 34 (or holes, notches, projections or other detectable features), each pair of marks being substantially 180° apart from the other on its peripheral surface. Arranged close to the periphery of the flywheel is a transducer 36 having an electrical coil 38 which is able to detect the passage past the transducer of the said marks 34 on the flywheel. This results in the transducer producing pairs of electrical pulses which bear a specific relation to the top dead centre position of each engine piston, or, in the case of opposedpiston engines, to the top dead centre position of one piston of each pair of pistons. As will be seen from FIG. 1, the electrical pulses from the transducer 36 are fed by conductors 40 to an electronic processor housed in a cabinet 46, the results being indicated on four read-out meters 42, one for each engine cylinder and piston.

A further difference between the engine shown in FIG. 1 and a conventional compression ignition engine is that a further transducer 44, in this instance a pressure transducer, is arranged on or in one of the fuel injection pipes 16. The transducer 44 is adapted to produce an electrical signal at the moment when its respective pipe 16 deforms due to the onset of a fuel injection pulse within the pipe. The signal from the transducer 44, like that from the transducer 36, is fed into the electronic processor in the cabinet 46.

As an alternative to having a pressure transducer arranged on or in a fuel injection pipe 16, it is also possible to have a pressure transducer arranged on, in or near a fuel injection pump. Another possibility is to use a removable pressure transducer which is simply attached to the outside of one of the fuel injection pipes 16 as and when testing is under way.

As an optional extra, either the engine itself or the engine test equipment can be provided with a smoke meter 48 which detects the opacity of the engine exhaust gases delivered by the exhaust pipe 50 of the engine. The meter 48 includes a photoelectric cell which receives a light beam passing through the exhaust gases and delivers an electrical signal through conductors 52 to the electronic processor in the cabinet 46. If desired, some other factor can be detected. For example, the exhaust gas back-pressure or, alternatively, the pressure in the inlet manifold of the engine.

As already indicated, the electronic processor in the cabinet 46 includes read-out meters 42 which display the BMEP for each cylinder and piston and the BMEP for the engine as a whole. The cabinet 46 also includes a meter 54 which detects the engine speed and a further meter 58 which gives the angular crankshaft relationship between the pulse from the pressure transducer 44 and the top dead centre of the corresponding piston derived from the output of the transducer 36 relating to the particular high pressure line containing the transducer 44. One or more of the meters 42, 54 and 58 can also have the dual purpose of indicating the electrical output of the photo-electric cell which forms part of the smoke meter 48, or a separate meter can be included for that purpose. Likewise, the peak current drawn by the engine starter as it turns the engine through each successive compression stroke can be indicated on the meters 42.

The BMEP for the engine as a whole is obtained by adding the separate BMEP values for each cylinder and piston. This gives the over-all power output during acceleration of the engine. The same display meters 42 are also used to give frictional horse-power in BMEP units during deceleration of the engine.

The measuring sequence carried out by the testing apparatus starts at a selected r.p.m. of the crankshaft 18 and is taken over one complete engine operating cycle, i.e., two revolutions of the crankshaft for a four-stroke engine. The meters 42, 54 and 58 are arranged to "hold" the various readings at the termination of the test to facilitate their being read. It is also desirable for the cabinet 46 to include a card reader 60, the card containing the necessary test parameters relating to the particular engine under test. Alternatively, the necessary parameters can be set manually on the testing apparatus by control knobs. Where a card is used, it will normally be a punched or otherwise coded card.

Connected to the electronic processor in the cabinet 46 by conductors 62 is a printer 64 which prints out on paper 66 the results of the tests carried out on the engine.

The testing apparatus described above is used in the following manner:

After all parts of the apparatus have been correctly connected to the engine and its exhaust pipe, the engine is started and allowed to warm up. The engine is then stopped and the apparatus is set by one of the control knobs 68 to read "starter current." The engine starter 26 is now operated without allowing the engine to start. In this way the peak current drawn by the starter for each of the compression strokes for each of the individual cylinders of the engine can be read off on the appropriate meter in the cabinet 46.

One of the control knobs on the cabinet 46 is now set to read "acceleration." The engine is re-started and allowed to idle, after which the acclerator is pressed hard down rapidly. Once the engine has reached maximum speed, the accelerator is released and the BMEP or some other units corresponding to acceleration is taken from the meters 42. The appropriate knob is then switched over to "deceleration" and the BMEP corresponding to deceleration is read off from the meters 42 in the same way.

The appropriate knob 68 on the cabinet 46 is then set to read "smoke" and a control set to the speed at which the smoke reading using the smoke meter 48 is to be taken. Another method is for the accelerator to be pressed hard down rapidly and the maximum smoke value read off on the appropriate meter of the cabinet 46. Where a separate meter for reading the smoke value is provided, the smoke value can be read off during the acceleration test mentioned above.

One of the control knobs 68 is then set to read "engine speed." The accelerator is again pressed hard down so as to allow the engine to reach its steady maximum speed which is read off on the appropriate meter. This reading gives the maximum possible speed of the engine permitted by the engine governor.

The apparatus is then set to read "cylinder balance" and appropriate controls set to the speed at which the balance is to be measured. The accelerator is once more pressed down hard so as to obtain a reading on the display meters 42 for the four cylinders of the engine both as regards their individual readings and the average of those readings. The average of those readings can be shown on additional meters not shown in the drawings or by switching a control knob on the meters 42.

The appropriate control knob is now set to read "timing," as well as the control which determines the speed at which the timing is to be measured. The accelerator is now depressed but more slowly this time. The timing angle is thus read off the meter 58.

The tests indicated above and the readings thereby obtained enable the following analysis to be deduced:

1. The readings for the peak current drawn by the starter show if the compression pressures of each cylinder are satisfactory and are in balance.
2. The averaged "cylinder balance" reading, when compared with previously prognosed results for the particular engine under test, shows if the engine delivers the required power.
3. The "smoke value" readings indicate whether the engine can deliver full power within a satisfactory smoke limit.
4. The "engine speed" reading shows whether the engine is able to reach its required maximum speed.

In general, if the engine passes tests 2, 3 and 4 in the analysis given above, then it is giving a satisfactory performance. Should it, however, fail one or more of the said tests, the fault or faults in the engine can be deduced as follows:

5. If the engine fails on the readings for the peak current drawn by the starter, the engine is probably suffering from poor compression. This fault will also be reflected in the "smoke value" reading and the "cylinder balance" readings.
6. If the engine fails on the readings for the individual cylinders in the "cylinder balance" test, then the fuel injection system for one or more of the cylinders is probably at fault. This fault will also have an effect on the "smoke value" reading and on the averaged cylinder balance reading.

7. If the engine fails the averaged cylinder balance test, but passes the "smoke value" test, then it is probably under-fuelled.
8. If the engine fails the "smoke value" test but passes the averaged cylinder balance test, then it is probably over-fuelled.
9. If the engine either fails or exceeds the "engine speed" test, then the maximum speed stop of the engine governor is incorrectly set.
10. If the engine fails on the averaged cylinder balance test and also fails the "timing angle" test, then the engine timing is incorrect.

It will of course be appreciated that other tests can be carried out to detect other possible fauls in the engine, depending on the particular requirements for that engine.

A typical engine, at 2,000 r.p.m., approximately and at full throttle, might increase in speed about 120 r.p.m. over one complete cycle. Because the torque characteristic from engine to engine differs considerably, it is desirable that the testing equipment be provided with a control which enables the measurement to be taken at a speed where the shape of the torque curve is best suited. A scaling control is also envisaged to enable the meters to display individual cylinder powers in suitable units such as percentage power, horse-power or BMEP. This setting is also necessary because of the varying characteristics of each engine.

Other controls will include selectors to feed the number of cylinders into the equipment, to select power, friction or compression and timing, and to print the results obtained. A resetting control can operate in conjunction with the control which selects power, and an on/off switch will also be provided.

In the example of engine testing described above, the engine has been assumed to be of four-stroke, four-cylinder type and in this configuration the readings of crankshaft instantaneous velocity are taken twice every engine revolution and are consequently 180° apart. These positions correspond exactly with the start and finished of the expansion stroke of each cylinder, and this can therefore be thought of as an ideal engine for analysis. When testing engines with a greater number of cylinders, it can be seen that the expansion stroke of one cylinder commences before the finish of the expansion stroke of the previous cylinder. In this connection, the points at which the instantaneous velocities are measured must be chosen so that the greatest part of the acceleration due to a particular cylinder is covered by the measurement period whilst at the same time keeping the effect of the accelerations due to the previous and succeeding cylinder firings down to a minimum.

FIG. 2 shows diagrammatically one form of electronic processor housed within the electronics cabinet 46 in order to process the signals generated by the various transducers on the engine under test so that the required information about this engine may be displayed in suitable form. This electronic processor will now be described in detail.

The starter current is monitored by a transducer 70 which detects the voltage drop across a resistive element, for example one of the starter motor supply leads, in the vehicle starter circuit. This voltage is then fed via the conductors 56 to the signal processor and analogue to digital converter unit 72 which is housed within the electronics cabinet 46. Here the signal is peak detected, and the peak voltage fed to the analogue to digital converter which converts the voltage to a digital form, for example a binary number expressed as a series of pulses. This digital signal is transferred to the digital processor 80 where it is held in a digital store so that it may be used for further processing or transferred to a suitable readout device. The peak detector is reset to zero at the command of a signal derived from the processing of the signal derived from the top dead centre transducer 36. In this way a signal representing the peak starter motor current of each cylinder in turn is fed into the store.

As already indicated, pairs of marks on the engine flywheel passing the top dead centre transducer 36 produce a pair of pulses every time the engine passes a position corresponding to the top dead centre of each cylinder in turn. These pulses are fed via conductors 40 to the signal processor and analogue to digital converter unit 72 where a shaper and filter circuit rids the signal of spurious variations. After a predetermined engine speed has been reached, the first pulse of each pair initiates a counter which counts the pulses from a standard clock pulse source of, say, 2 million pulses per second. The second pulse of each pair stops the counter, and the count then recorded (which represents the time between the pulses in digital form) is fed to the digital processor 80 where it is held in a digital store for further processing.

The pressure transducer 44 produces a pulse at the onset of fuel injection to the particular cylinder with which it is associated. This pulse is fed to the signal processor and analogue to digital converter unit where appropriate circuitry filters and shapes the pulse to rid it of spurious, unwanted changes. The above-mentioned clock measures the time interval between the pulse and the crank top dead centre signal from the top dead centre transducer. This time interval is then fed to the digital processor unit where it is held in an appropriate digital store and used for further processing and computation with respect to engine speed and conversion to timing angle in crank degrees. This signal also serves to identify those readings relating to individual cylinders.

Further analogue transducers 76 — for example, a smoke detector and an inlet depression transducer — can be attached to the vehicle under test. When the engine reaches an appropriate predetermined speed, the signals from these transducers, when used, are then fed to the signal processor and analogue to digital converter unit where appropriate circuitry is used to shape them and feed them to the analogue to digital converter which produces digital signals equivalent to the analogue inputs. These are then fed to the stores within the digital processor unit.

The digital processor unit 80 consists of the electronic circuitry necessary to carry out the required processing of the signals received from the signal processor and analogue to digital converter unit, and to present the processed signals in a suitable form to operate the readout devices 64 or 82. The electronic circuitry includes digital memory stores, a central processor and an arithmetic unit. In one form, these components can be hard-wired together to provide the necessary processing and computation. In another form, these components can be controlled by a suitable programme held in a digital memory. It is necessary for information to be fed into the digital processor concerning the particular set of tests being carried out and the particular constants and parameters relating to the particular engine under test. This information can be supplied from a set of knobs, switches or other suitable electrical selectors 86. These feed such information as selection of the number of engine cylinders, selection of a set speed for a given text, selection of the test mode, and the setup of the relevant scaling factors. Alternatively, this information can be fed into the digital processor by means of a reader 60. This reader takes information typically from cards punched with holes representing the values and test selections relating to the particular tests required and the particular engine under test.

Within the digital processor, the signals representing, in digital form, the inputs from the transducers, are operated upon according to the instructions contained in the central process unit. The results of the various operations and calculations are held in digital form in a store ready to be fed to the readout devices 64 and 82.

The information can be fed to the operator by various forms of readout device. For example, in one form, each parameter required can be fed to an individual digital display which will show the value of the particular parameter being measured. In another form, each parameter can be fed to a meter which will show the value of each parameter. In this case the readout meters will require a digital to analogue converter associated with them in order that the binary number held in the store can be converted to an analogue voltage or current suitable for driving meters. In other form, one meter or digital read out can be used in conjunction with a parameter selector circuit which enables each parameter reading in turn to be displayed either by manual selection or automatic selection. Alternatively, the parameters can be fed to a printer which will print out a permanent record of the results achieved by the equipment.

It is to be understood that the readout devices of the equipment as sold commercially can consist of one of the above forms or combinations of them as desired.

FIG. 3 illustrates a different electronic processor. This is not so attractive as that shown in FIG. 2 and will not, therefore, be described in detail. Its function will, however, be apparent from the legends and other information given on the circuit itself.

It will thus be seen that the invention provides a very practical form of engine test equipment which is especially useful for testing compression-ignition engines and petrol-ignition engines after they have been installed in vehicles such as motor cars or lorries. (It is, however, to be understood that the equipment of the invention can equally well be used to test engines in stationary installations, for example, power plants.) In particular, the equipment of the present invention diagnoses engine faults by using the change of angular velocity produced as a result of the work done, or energy absorbed, by each individual cylinder of the engine during a given period of free acceleration, acceleration or running, and hence to display or indicate a function related to the individual cylinder power and overall engine power.

The theory underlying the invention is that the instantaneous angular velocity is assessed, using the relationship $v \propto 1/t$, by measuring the time ($t$) for the crank to rotate through a small angle, say 20°. This instantaneous velocity of the crankshaft is measured at a predetermined angle relative to the top dead centre (TDC) of each cylinder. Thus, each measurement represents the angular velocity $v$ caused mainly by the preceding firing stroke and also the initial velocity $u$ affecting mainly the succeeding firing stroke.

Successive instantaneous velocities are squared and differenced to produce a result proportional to the mean acceleration $a$ between measurements according to the formula:

$$a \propto v^2 - u^2$$

In practice, this acceleration is substantially proportional to the brake mean effective pressure (BMEP) of the particular cylinder which has fired between successive measurements taken.

The actual BMEP of a given engine can be displayed by multiplying the acceleration $a$ by a scaling factor particular to that engine type.

In order that the measurement of cylinder powers can be used to isolate any fault to a particular cylinder, it is necessary to identify a particular cylinder in each engine cycle by counting back or by a cranking test. This is achieved, as described above, by using the change of pressure which occurs in the fuel injection system relative to one particular cylinder at the onset of a fuel injection period.

Operating the engine at a steady speed and measuring the time between the commencement of the fuel injection of a particular cylinder, and the time when the initial velocity measurement of that particular cylinder is made produces a result which is directly related to the timing angle of that cylinder. The timing angle can therefore be displayed by multiplying the time interval measured by the angular speed of the engine.

I claim:

1. Engine test equipment for testing an engine having a rotatable crankshaft, said test equipment comprising a rotatable engine part which, in operation of the engine, rotates at a rate dependent on the rate of rotation of the engine crankshaft, at least one pair of accurately-positioned circumferentially spaced-apart marks on the said rotatable engine part, a transducer positioned adjacent the said rotatable engine part to detect the passage past the transducer of each mark during operation of the engine, means in the transducer to produce a pair of electrical pulses as the marks move past the transducer, an electronic processor connected to said transducer to receive the said pulses, a standard clock pulse source forming part of said processor, a counter, also forming part of said processor, for counting the pulses of said standard clock pulse source, the first pulse of each pair of pulses from the transducer serving to initiate counting of the pulses from the clock pulse source by the counter, and the second pulse of each pair of pulses from the transducer serving to stop counting of the pulses from the clock pulse source by the counter, a first digital store and a second digital store in said electronic processor connected to said counter to receive a first count and a second count from the clock pulse source counted by the counter, and further means in said electronic processor to indicate, on the basis of said first and second counts of pulses counted by the counter, a quantity directly related to the BMEP for at least one piston and cylinder of the engine.

2. Engine test equipment according to claim 1, in which the rotatable engine part is the flywheel of the engine.

3. Engine test equipment according to claim 1, in which said pair of marks and said pulses fed into the processor have a specific relation to the top dead centre position of at least one engine piston.

4. Engine test equipment according to claim 1, in which the rotatable engine part has as many pairs of marks as there are firing strokes during one revolution of the said rotatable engine part, the marks of each pair being circumferentially spaced apart by the same amount, and the pairs of marks being substantially equi-spaced circumferentially on the rotatable engine part.

5. Engine test equipment according to claim 1 in combination with a fuel injection system for said engine and having a pressure transducer so positionable in relation to said fuel injection system as to produce an electrical signal on the occurrence of a fuel injection pressure pulse, and means for feeding that pulse into said electronic processor.

6. Engine test equipment according to claim 5 in combination with an indicator, wherein signals from said pressure transducer and the transducer adjacent said rotatable part are processed in said electronic processor to display the angular time relationship between the top dead centre of a piston of the engine and the occurrence of fuel injection on said indicator.

7. Engine test equipment according to claim 1 in combination with a valve member in a fuel injection system of said engine, and having a transducer positioned in relation to said valve member as to produce an electrical signal on the occurrence of lift of the valve, and means for feeding said signal into the electronic processor.

8. Engine test equipment according to claim 7 in combination with an indicator, wherein signals from the valve lift detecting transducer and the transducer adjacent the said rotatable part are processed in said electronic processor to display the angular time relationship between the top dead centre of a piston of the engine and the occurrence of fuel injection on said indicator.

9. Engine test equipment according to claim 1 in which the standard clock pulse source produces 2,000,000 or more pulses per second.

10. Engine test equipment according to claim 1 having a transducer for positioning adjacent to an engine part to detect smoke emission from the engine, and means for feeding a signal from the said transducer to the electronic processor which displays the maximum reading thus obtained during at least a defined part of an acceleration test on the engine.

11. Engine test equipment for testing an engine having a rotatable crankshaft, said test equipment comprising a rotatable engine part which, in operation of the engine, rotates at a rate dependent on the rate of rotation of the engine crankshaft, at least one accurately positioned mark on the said rotatable engine part, a first transducer and a second transducer both positioned adjacent the said rotatable engine part and spaced-apart circumferentially thereof to detect the passage past each transducer of the said mark during operation of the engine means in each transducer to produce an electrical pulse as the mark moves past the respective transducer, an electronic processor connected to said transducers to receive the said pulses, a standard clock pulse source forming part of said processor, a counter, also forming part of said processor, for counting the pulses of said standard clock pulse source, the pulse from said first transducer serving to initiate counting of the pulses from the clock pulse source by the counter, and the pulse from the said second transducer serving to stop counting of the pulses from the clock pulse source by the counter, a first digital store and a second digital store in said electronic processor connected to said counter to receive a first count and a second count of pulses from the clock pulse source counted by the counter, and further means in said electronic processor to indicate, on the basis of said first and second counts of pulses counted by the counter, a quantity directly related to the BMEP for at least one piston and cylinder of the engine.

12. Engine test equipment according to claim 11, in which the rotatable engine part is the flywheel of the engine.

13. Engine test equipment according to claim 11, in which said mark and the pulses fed into the processor have a specific relation to the top dead centre position of at least one engine piston.

14. Engine test equipment according to claim 11, in which the rotatable engine part has as many marks as there are firing strokes during one revolution of the said rotatable engine part, the marks being substantially equi-spaced circumferentially on the rotatable engine part.

15. Engine test equipment according to claim 11 in combination with a fuel injection system for said engine, and having a pressure transducer so positionable in relation to said fuel injection system as to produce an electrical signal on the occurrence of a fuel injection pressure pulse, and means for feeding that pulse into the electronic processor.

16. Engine test equipment according to claim 15 in combination with an indicator, wherein signals from the pressure transducer and the transducers adjacent the said rotatable part are processed in said electronic processor to display the angular time relationship between the top dead centre of a piston of the engine and the occurrence of fuel injection on said indicator.

17. Engine test equipment according to claim 11 in combination with a valve member in a fuel injection system of the engine, and having a transducer so positioned in relation to said valve member as to produce an electrical signal on the occurrence of lift of the valve, and means for feeding that signal into the electronic processor.

18. Engine test equipment according to claim 17 in combination with an indicator, wherein the signals from the valve lift detecting transducer and the transducers adjacent the said rotatable part are processed in said electronic processor to display the angular time relationship between the top dead centre of a piston of the engine and the occurrence of fuel injection on said indicator.

19. Engine test equipment according to claim 11 having a transducer for positioning adjacent to an engine part to detect smoke emission from the engine, and means for feeding a signal from the said transducer to the electronic processor which displays the maximum reading thus obtained during at least a defined part of an acceleration test on the engine.

* * * * *